United States Patent
Schwarz et al.

(10) Patent No.: US 8,312,197 B2
(45) Date of Patent: Nov. 13, 2012

(54) METHOD OF ROUTING AN INTERRUPT SIGNAL DIRECTLY TO A VIRTUAL PROCESSING UNIT IN A SYSTEM WITH ONE OR MORE PHYSICAL PROCESSING UNITS

(75) Inventors: Christian Schwarz, Rousset (FR); Joel Porquet, Aix en Provence (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 522 days.

(21) Appl. No.: 12/541,792

(22) Filed: Aug. 14, 2009

(65) Prior Publication Data

US 2010/0049892 A1  Feb. 25, 2010

(30) Foreign Application Priority Data

Aug. 19, 2008  (FR) ..................................... 08 04621

(51) Int. Cl.
*G06F 13/00*  (2006.01)
(52) U.S. Cl. ........................................ 710/268; 710/267
(58) Field of Classification Search .................. 710/262, 710/264, 267, 268; 718/1
See application file for complete search history.

(56) References Cited

U.S. PATENT DOCUMENTS

| 5,918,057 A | 6/1999 | Chou et al. |
| 7,546,406 B2 * | 6/2009 | Armstrong et al. ............ 710/267 |
| 7,657,694 B2 * | 2/2010 | Mansell et al. .................... 711/6 |
| 7,707,341 B1 * | 4/2010 | Klaiber et al. ................ 710/244 |
| 2003/0182484 A1 | 9/2003 | Gaur et al. |
| 2004/0073910 A1 | 4/2004 | Hokenek et al. |
| 2009/0204959 A1 * | 8/2009 | Anand et al. ...................... 718/1 |

* cited by examiner

*Primary Examiner* — Glenn A Auve
(74) *Attorney, Agent, or Firm* — Seed IP Law Group PLLC

(57) ABSTRACT

The present disclosure relates to a method of processing an interrupt comprising a peripheral unit sending an interrupt, the interrupt being intended for a virtual unit executed by a processing unit, transmitting the interrupt to an interrupt control unit coupled to a processing unit, and the interrupt control unit storing the interrupt in an interrupt register. According to an embodiment of the present disclosure, the interrupt is transmitted to the interrupt control unit in association with an identifier of the virtual unit receiving the interrupt, the interrupt register in which the interrupt belonging to a set of registers is stored comprising one interrupt register per virtual unit likely to be executed by the processing unit, the interrupt being transmitted to the processing unit if the virtual unit receiving the interrupt is being executed by the processing unit.

24 Claims, 4 Drawing Sheets

METHOD OF ROUTING AN INTERRUPT SIGNAL DIRECTLY TO A VIRTUAL PROCESSING UNIT IN A SYSTEM WITH ONE OR MORE PHYSICAL PROCESSING UNITS

BACKGROUND

1. Technical Field

The present disclosure relates to data processing systems with one or more processing units interconnected in a network, and particularly SoC (System on Chip) systems integrated into a chip or semiconductor chip and NoC (Network on Chip) systems comprising an integrated network interconnecting processing units and peripheral units. The present disclosure relates more particularly to routing interrupts in such a system.

In some embodiments, the present disclosure can particularly be applied to set-top boxes comprising a chip integrating several processing units.

2. Description of the Related Art

FIG. 1 schematically represents an integrated data processing system to which embodiments of the present disclosure can be applied. In FIG. 1, the system PS1 comprises a physical central processing unit CPU, several peripheral units PRP1, PRP2, PRP3, and an interconnected network NW linking the central processing unit to the peripheral units. The system also comprises an interrupt control unit ICU connected to the unit CPU and to the units PRP1-PRP3, to manage and route to the unit CPU the interrupt signals from the units PRP1-PRP3. The peripheral units PRP1-PRP3 may for example comprise memories, interface units for interfacing with external memories, and input/output ports.

The unit ICU particularly comprises an interrupt signal register S storing the active/inactive state of the interrupts, and an interrupt mask register M storing a masked/unmasked state of each of the interrupts stored in the register S.

The unit CPU can time-share execute several independent applications or operating systems CP1, CP2, CP3, CP4 referred to below as "machine," "virtual unit" or "virtual processing unit". Generally, a virtual unit means a software component capable of working in a native and autonomous manner on one or more processors. For this purpose, the unit CPU executes a trust agent TA which acts as a hypervisor to enable the execution of several virtual units, for example in a virtualization context. The agent TA thus manages the activation and the deactivation of the virtual units, for example depending on their priority levels and access rights to the resources of the system. The agent TA also routes each interrupt reported by the unit ICU to the virtual unit CP1-CP4 specified as receiving the interrupt.

Every time there is an interrupt, the unit ICU activates the agent TA executed by the unit CPU, which greatly consumes the processing resources of the unit CPU. If the interrupt were masked by the virtual unit CP1-CP4 receiving the interrupt, the agent TA will have been activated unnecessarily. The same is true if the virtual unit receiving the interrupt were inactive at the time the interrupt arrived, another virtual unit having higher priority being executed. If the virtual unit receiving the interrupt is activated to the detriment of another virtual unit being executed, the virtual unit activated can have a less high priority than the virtual unit being executed.

Furthermore, activating a virtual unit CP1-CP4 generally involves storing an execution context of another virtual unit CP1-CP4 being executed and to be deactivated, and loading the context of the virtual unit to be activated, operations which can consume a lot of execution time.

FIG. 2 represents a processing system PS2 comprising several physical processing units CPU1, CPU2 connected to each other and to the peripheral units PRP1, PRP2, PRP3 through the network NW. Each processing unit CPU1, CPU2 is connected to a respective interrupt control unit ICU1, ICU2 which can be identical to the unit ICU represented in FIG. 1. Each processing unit CPU1, CPU2 executes a trust agent or hypervisor that is specific to each processing unit for security reasons and/or because some processing units are specialized in performing specific processes more efficiently, and/or because some specialized processing units are not able to implement several virtual units.

The unit ICU1 receives the interrupts from the peripheral units PRP1 and PRP2, and the unit ICU2 receives the interrupts from the peripheral unit PRP3. Therefore, the routing of the interrupts from the units PRP1-PRP3 is determined by the connections between firstly the units ICU1 and ICU2, and secondly the peripheral units. The architecture thus shown in FIG. 2 has the disadvantage of lacking flexibility as regards the routing of the interrupts from the peripheral units PRP1-PRP3 to one or other of the processing units CPU1, CPU2. If one of the agents TA of the units CPU1, CPU2 is configured to be the main agent of the system, it is necessary to implement communications between the main agent and the other agents TA. Therefore, this solution is highly consuming in terms of software and performance.

This lack of flexibility can be remedied by the system architecture shown in FIG. 3. Thus, FIG. 3 represents a processing system PS3 also comprising processing units CPU1, CPU2 each associated with an interrupt control unit ICU1, ICU2, and peripheral units PRP1-PRP3. To enable each interrupt coming from one or other of the units PRP1-PRP3 to be routed to one or other of the units CPU1, CPU2, the system PS3 further comprises a network dedicated to the transmission of the interrupts comprising a shared and configurable interrupt control unit SICU interconnected between, firstly, the two units ICU1 and ICU2, and secondly, the units PRP1-PRP3. Therefore, by configuration of the unit SICU, an interrupt coming from any unit PRP1-PRP3 can be routed to one or other of the units CPU1 and CPU2. However, the architecture shown in FIG. 3 requires additional circuits particularly to produce the unit SICU, and additional communications to enable the unit SICU to be configured. This architecture also poses a security problem if all the agents TA of the units CPU1, CPU2 can configure the unit SICU, or requires the implementation of a main agent and of the additional communications between the agents allocated to the units CPU1, CPU2 and the main agent.

BRIEF SUMMARY

One embodiment improves the processing and routing of interrupts coming from peripheral units in an integrated processing system comprising several virtual processing units implemented by one or more physical processing units. Thus, in a multiprocessor system with several physical processing units, one embodiment executes a virtual processing unit indifferently on one or other of the physical processing units. For this purpose, one embodiment routes an interrupt to a virtual processing unit, independently of the physical processing unit executing the virtual processing unit.

In such a system, one embodiment routes the interrupts by limiting the access to the hypervisor which greatly consumes execution time. One embodiment reduces the complexity of the circuits and programs that manage and route the interrupts.

According to one embodiment, there is provided a method of processing an interrupt comprising steps of: a peripheral unit sending an interrupt, the interrupt being intended for a virtual unit executed by a processing unit, transmitting the interrupt to an interrupt control unit coupled to a processing unit, and the interrupt control unit storing the interrupt in an interrupt register. According to one embodiment, the interrupt is transmitted to the interrupt control unit in association with an identifier of the virtual unit receiving the interrupt, the interrupt register being associated with the identifier and belonging to a set of registers comprising one interrupt register per virtual unit identifier likely to be executed by the processing unit, the interrupt being transmitted to the processing unit if the virtual unit receiving the interrupt is being executed by the processing unit.

According to one embodiment, the interrupt is transmitted to the interrupt control unit through a network transmitting data in the form of packets between the processing unit and the peripheral units, in a packet containing an identifier of the interrupt and a virtual unit identifier, which is transmitted with a maximum quality of service.

According to one embodiment, the interrupt is transmitted to the processing unit if it is not masked by an interrupt mask register associated with the interrupt register of the virtual unit receiving the interrupt.

According to one embodiment, the interrupt is transmitted to the processing unit if the virtual unit receiving the interrupt is not being executed by the processing unit, but if the number of interrupts stored in the interrupt register associated with the receiving virtual unit exceeds a certain threshold.

According to one embodiment, the interrupt is transmitted to the processing unit if the virtual unit receiving the interrupt is not being executed by the processing unit, but if a priority granted to the interrupt exceeds a certain threshold.

According to one embodiment, the transmission of the interrupt to an interrupt control unit coupled to a processing unit, comprises steps of determining the processing unit in which the virtual unit receiving the interrupt is executed, depending on the virtual unit identifier transmitted in association with the interrupt, the interrupt being transmitted to an interrupt control unit coupled to the determined processing unit.

According to one embodiment, the method comprises steps of the processing unit notifying the interrupt control unit that a virtual unit has been activated, and of the interrupt control unit supplying the processing unit with the interrupts stored in the interrupt register for the activated virtual unit.

According to one embodiment, there is also provided a data processing system comprising a processing unit coupled to an interrupt control unit, and peripheral units linked to the processing unit by a transmission network, the peripheral units being configured for sending the interrupt control unit an interrupt intended for a virtual unit executed by the processing unit, the interrupt control unit being configured for storing each interrupt received in an interrupt register, and for transmitting each interrupt received to the processing unit. According to one embodiment, the interrupt control unit is configured for: receiving interrupts in association with an identifier of a virtual unit receiving the interrupt, storing each interrupt received in an interrupt register corresponding to the associated identifier and belonging to a set of registers comprising one interrupt register per virtual unit likely to be executed by the processing unit, and transmitting each interrupt to the processing unit if the virtual unit receiving the interrupt is being executed by the processing unit.

According to one embodiment, the network is configured for transmitting data in the form of packets with an adjustable quality of service, the interrupt control unit being configured for receiving each interrupt in a packet containing an identifier of the interrupt and a virtual unit identifier, transmitted by the network with a maximum quality of service.

According to one embodiment, the interrupt control unit is configured for transmitting an interrupt to the processing unit if it is not masked by an interrupt mask register associated with the interrupt register of the virtual unit receiving the interrupt.

According to one embodiment, the interrupt control unit is configured for transmitting an interrupt to the processing unit if the virtual unit receiving the interrupt is not being executed by the processing unit, but if the number of interrupts stored in the interrupt register associated with the receiving virtual unit exceeds a certain threshold.

According to one embodiment, the interrupt control unit is configured for transmitting an interrupt to the processing unit if the virtual unit receiving the interrupt is not being executed by the processing unit, but if a priority granted to the interrupt exceeds a certain threshold.

According to one embodiment, the system comprises several processing units each coupled to an interrupt control unit, the network being configured for routing an interrupt to the interrupt control unit depending on the virtual unit identifier transmitted in association with the interrupt.

According to one embodiment, the processing unit is configured for notifying the interrupt control unit of the activation of a virtual unit.

BRIEF DESCRIPTION OF THE SEVERAL VIEWS OF THE DRAWINGS

Examples of embodiments of the present invention will be described below, in relation with, but not limited to, the accompanying figures, in which.

DETAILED DESCRIPTION

Figure 1:
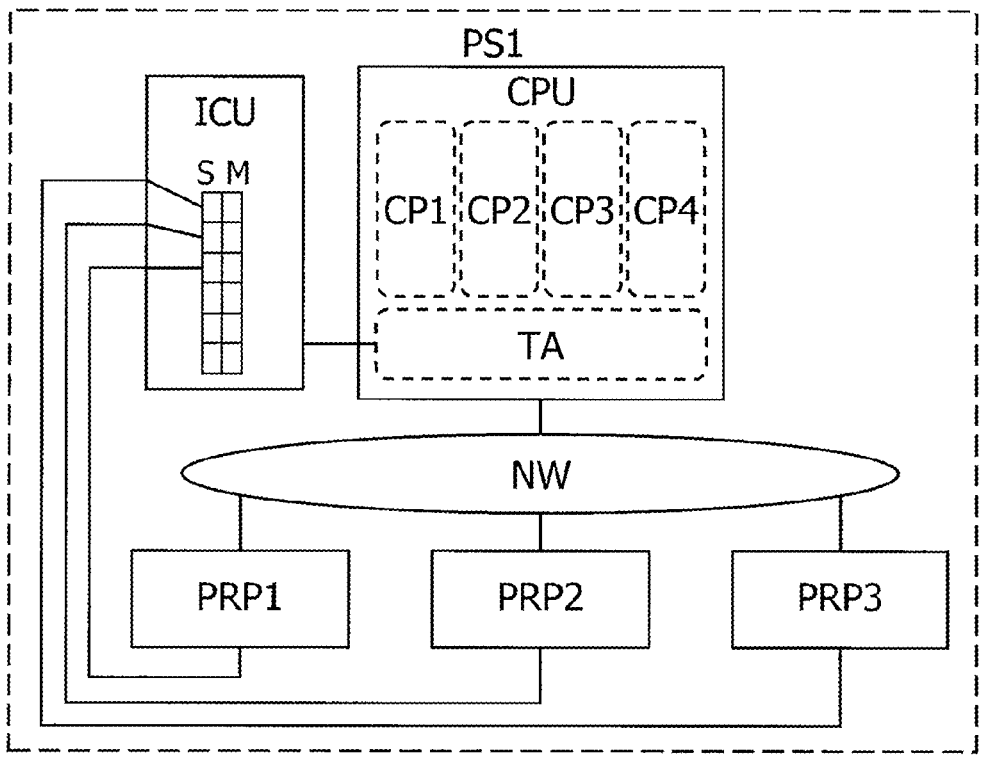
FIGS. 1 to 3 described above schematically represent data processing systems, according to prior art, FIG. 4 schematically represents a data processing system, according to a first embodiment, FIG. 5 schematically represents a data processing system, according to a second embodiment, FIG. 6 schematically represents a data processing system, according to a third embodiment, FIG. 7 schematically represents a data processing system, according to a fourth embodiment, FIG. 8 schematically represents a data processing system, according to a fifth embodiment.
Figure 2:
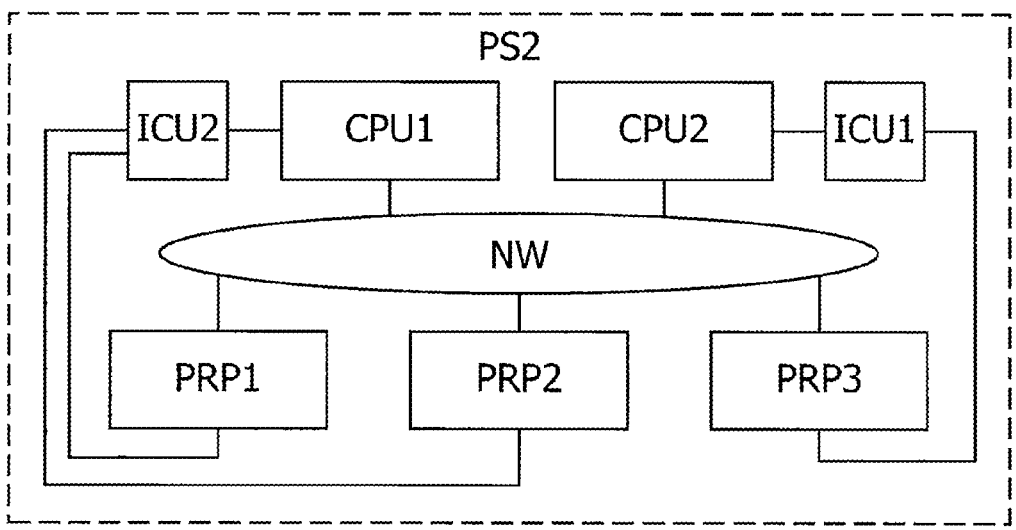
Figure 3:
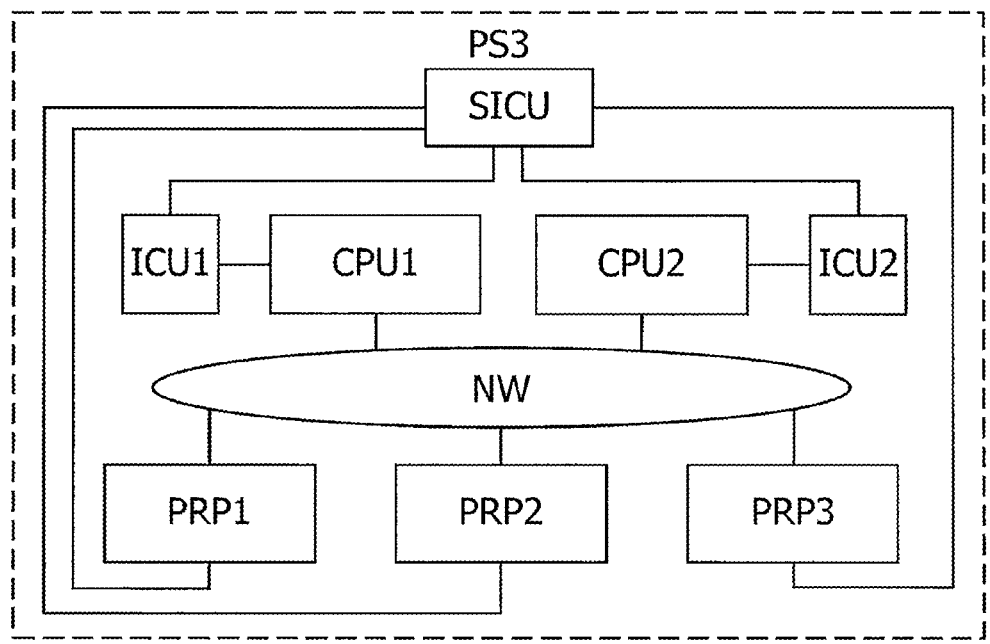
Figure 4:
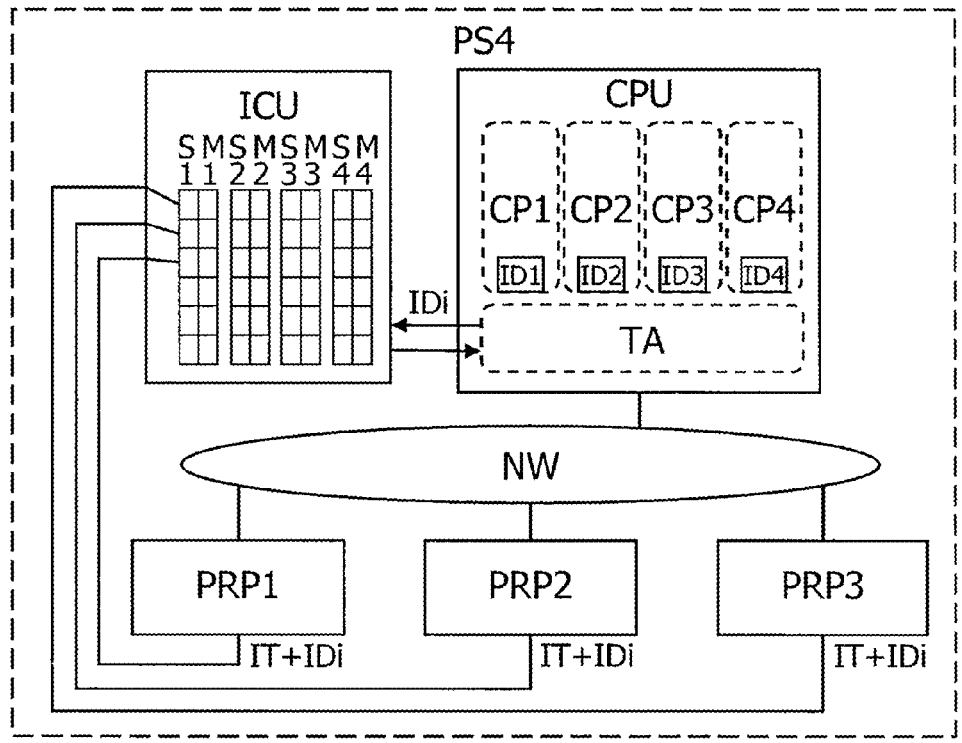

FIG. 4 schematically represents an integrated data processing system. In FIG. 4, the system PS4 comprises a physical central processing unit CPU, several peripheral units PRP1, PRP2, PRP3, and an interconnected network NW, linking the unit CPU to the units PRP1-PRP3. The system PS4 also comprises an interrupt control unit ICU connected to the unit CPU and to the units PRP1-PRP3, to manage and route the interrupt signals coming from the units PRP1-PRP3 to interrupt inputs of the unit CPU. The peripheral units PRP1-PRP3 may for example comprise memories, interface units for interfacing with external memories, and input/output ports.

The unit CPU may time-share execute several virtual processing units CP1-CP4, for example in a virtualization context. Specific rights for accessing the resources (memory, external accesses) of the system can be allocated to each virtual unit CP1-CP4. For this purpose, the unit CPU executes a trust agent TA which acts as a hypervisor to allocate the computing resources of the unit CPU to each virtual unit CP1-CP4, for example according to a sequencing schedule, or depending on priority levels. The agent TA also manages access rights of the virtual units CP1-CP4 to access the system resources, and the routing of each interrupt reported by the unit ICU, to the virtual unit specified as receiving the interrupt. The agent TA may also implement several operating systems on the processing unit CPU for the virtual units.

According to one embodiment, for each virtual unit CP1-CP4 the unit ICU comprises an interrupt register S1-S4, and an interrupt mask register M1-M4. Each register S1-S4 stores the active/inactive state of the interrupts for the corresponding virtual unit. Each masking register M1-M4 stores a masked/unmasked state of each of the interrupts stored in the register S1-S4 of the corresponding virtual unit. Furthermore, the peripheral units PRP1-PRP3 are configured and connected to the unit ICU to transmit with each interrupt IT an identifier ID1-ID4 of the virtual processing unit CP1-CP4 receiving the interrupt. For this purpose, the virtual unit identifier has previously been transmitted by the virtual unit to the peripheral unit during a configuration phase in which the peripheral unit is configured by the virtual unit. After receiving an interrupt, the unit ICU selects one of the registers S1-S4 and one of the corresponding registers M1-M4, to be updated according to the virtual unit identifier IDi associated with the interrupt received, and updates the memory cell of the register S1-S4 selected, corresponding to the interrupt signal. At a given time, only one of the registers S1-S4 is active and corresponds to the virtual unit CP1-CP4 being executed by the unit CPU. If an interrupt is activated in a register S1-S4 of a non-active virtual unit, the latter remains waiting to be processed until the unit ICU is informed by the unit CPU that the corresponding virtual unit has been activated. If, on the contrary, the interrupt relates to the active virtual unit and is not masked as indicated by the corresponding register M1-M4, the unit ICU immediately reports the interrupt to the processing unit CPU.

If the agent TA activates another of the virtual units CP1-CP4, it informs the unit ICU thereof by transmitting it the identifier ID1-ID4 of the activated virtual unit. The unit ICU then activates the register S1-S4 and the register M1-M4 corresponding to the new virtual unit CP1-CP4 activated, and supplies the unit CPU with all the unmasked interrupts pending for the activated virtual unit.

The identifiers ID1-ID4 of the virtual units CP1-CP4 can be allocated by the agent TA which may thus create new virtual units or remove some of them. An identifier can also be allocated to the agent TA particularly so that it can receive interrupts.

The network NW comprises means for transporting the virtual unit identifiers ID1-ID4 that are allocated by the agent TA. When the agent TA activates a virtual unit, it supplies the identifier of the virtual unit to the unit CPU. All the transactions initiated by the physical processing unit on behalf of the virtual unit will then be marked with this identifier when transmitted by the network NW. This mechanism is totally transparent for the virtual units CP1-CP4.

The unit ICU can be configured to send an interrupt signal to the unit CPU if the number of interrupts waiting to be processed and stored in one of the non-active registers S1-S4 exceeds a certain threshold which can be adjustable. The receipt of the interrupt signal by the unit CPU causes the activation of the agent TA which then decides whether or not to immediately activate the virtual unit for which the pending interrupts are intended.

Particularly in the case of a real-time processing system, the unit ICU can also be configured to allocate a priority level to each interrupt, and to send an interrupt signal to the unit CPU even if the virtual unit CP1-CP4 associated with the interrupt is inactive, when the priority level of the interrupt exceeds a certain threshold which can be adjustable. Here again, the receipt of the interrupt signal by the unit CPU causes the activation of the agent TA so that it activates the virtual unit CP1-CP4 to which the interrupt is intended.

According to one embodiment, the agent TA is configured for allocating to each virtual unit CP1-CP4 rights for accessing the resources of the system. The resources can be peripheral units PRP1-PRP3, and memory zones in memories. Therefore, the agent TA is configured to filter the access to the units PRP1-PRP3, requested by the virtual units CP1-CP4. If one of the peripheral units PRP1-PRP3 is a DMA control unit, the DMA control unit can be configured to store in a table the identifiers ID1-ID4 of the virtual units CP1-CP4 having requested a data transfer by block, in association with the start address and the length of the data block to be transferred, and the destination address of the block. The information stored in the table is transmitted in a transfer request message by a virtual unit CP1-CP4 to the DMA control unit. When transferring a block, the DMA control unit transmits the identifier of the virtual unit having requested the transfer, so that it can be determined if the access to the memory to perform the block transfer is authorized for the virtual unit having requested the transfer.

Figure 5:
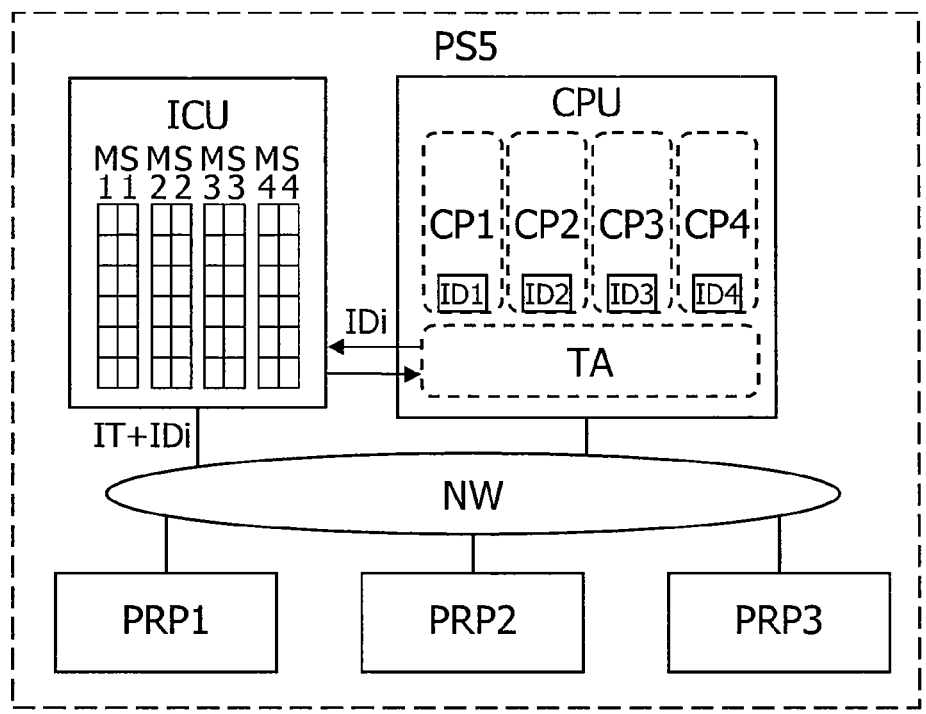

FIG. 5 represents an integrated data processing system PS5, according to another embodiment. The system PS5 is different from the system PS4 represented in FIG. 4 in that each interrupt is transmitted in the form of an interrupt message by the network NW between the peripheral units PRP1-PRP3 and the unit ICU. Each interrupt message thus contains an interrupt identifier associated with an identifier of the virtual unit receiving the interrupt. Furthermore, the network NW is configured for transmitting data in the form of packets, for allocating different qualities of service to the data packets it transmits, and for allocating to the packets containing an interrupt message a maximum quality of service to transmit them to their recipients within a guaranteed maximum time. For this purpose, the network NW may for example be configured to create virtual channels to transmit the packets, and to allocate a bandwidth to each virtual channel, the virtual channels created to transmit the interrupt messages being allocated a maximum bandwidth. The network NW can also be configured to guarantee a maximum transmission time for certain packets and particularly the interrupt message transmission packets. Upon receiving an interrupt message, the unit ICU determines the register S1-S4, then the cell of the determined register in which the interrupt must be stored, according to the virtual unit ID1 and interrupt IT identifiers transmitted in the interrupt message.

Figure 6:
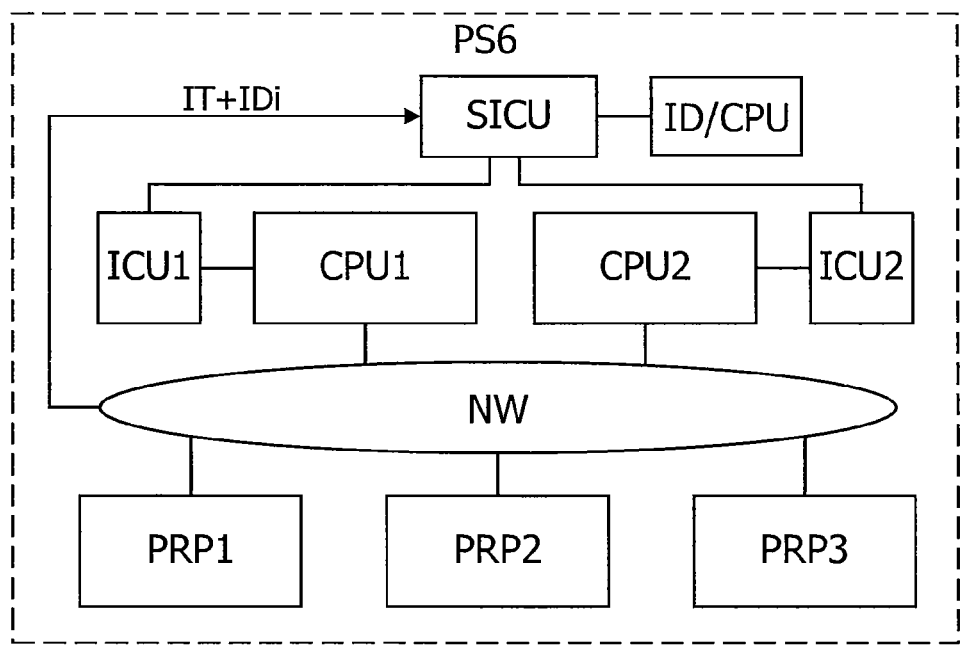

FIG. 6 represents an integrated data processing system PS6, according to another embodiment. The system PS6 differs from the system PS5 represented in FIG. 5 in that it comprises two physical processing units CPU 1, CPU2, each processing unit being connected to a respective interrupt control unit ICU1, ICU2. To route each interrupt message to the processing unit CPU1, CPU2 in which the virtual unit CP1-CP4 receiving the interrupt is executed, the system PS6 also comprises a shared and configurable interrupt control unit SICU interconnected between the network NW and the two units ICU1 and ICU2. The unit SICU can access data ID/CPU indicating for each virtual unit CP1-CP4, the processing unit CPU1, CPU2 which executes the virtual unit. The unit SICU may thus route each interrupt to the physical unit CPU1, CPU2 executing the virtual unit CP1-CP4 receiving the interrupt.

It shall be noted that in the system PS6, the interrupts can be transmitted between the peripheral units PRP1-PRP3 and the unit SICU either by a specific network as shown by FIG. 4, or by the network NW as shown by FIG. 5.

Figure 7:
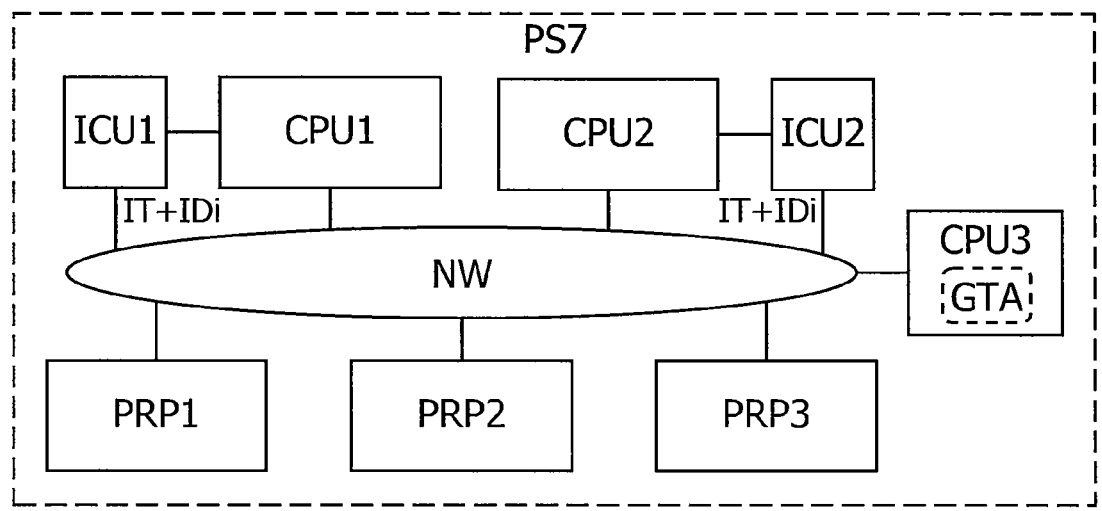

FIG. 7 represents an integrated data processing system PS7 according to another embodiment. The system PS7 differs from the system PS6 represented in FIG. 6 in that it does not comprise any unit SICU, but a global agent GTA for example implemented by a physical processing unit CPU3 connected to the network NW. The agent GTA manages the virtual units CP1-CP4 likely to be executed in the system PS7 by allocating them a unique identifier and by activating them on one or other of the physical processing units CPU1, CPU2. Thus, when an interrupt is transmitted by the network NW in association with a virtual unit identifier IDi, it is routed to the unit ICU1, ICU2 of the physical processing unit CPU1, CPU2 executing the virtual unit CP1-CP4 corresponding to the identifier IDi.

Figure 8:
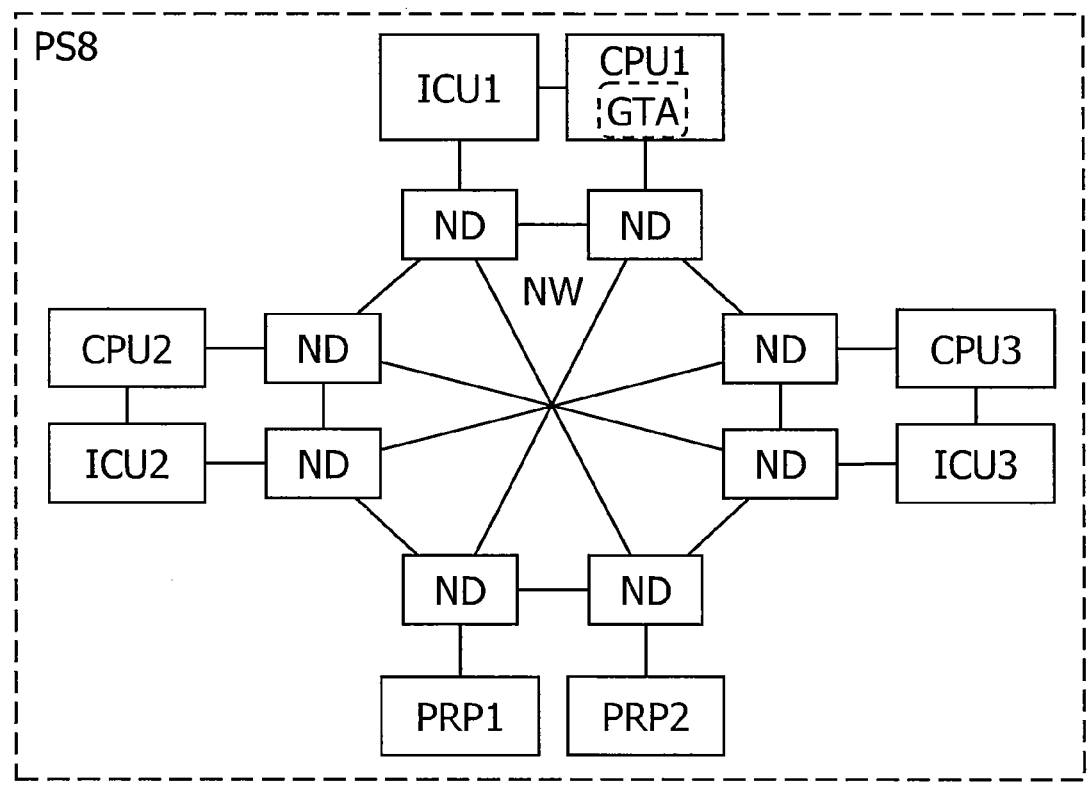

FIG. 8 schematically represents an integrated data processing system PS8, according to another embodiment. The system PS8 differs from the system PS7 in that it comprises several physical processing units CPU1-CPU3 and several peripheral units PRP1, PRP2, each of the units CPU1-CPU3 being coupled to a respective interrupt control unit ICU1-ICU3. The processing units CPU1-CPU3, the units ICU1-ICU3 and the peripheral units PRP1, PRP2, are each connected to the network NW through a router ND. One of the processing units, for example the unit CPU1, implements a global agent GTA like the one in FIG. 7, each processing unit implementing a local agent TA.

So as to provide a sufficient quality of service to be able to transmit interrupts, the network NW can be of the type described in the document "Spidergon: a novel on-chip communication network", Coppola, M.; Locatelli, R.; Maruccia, G.; Pieralisi, L.; Scandurra, A. System-on-Chip, 2004. Proceedings. 2004 International Symposium, 16-18 Nov. 2004, Page(s): 15-, or of the DSPIN type described in the document "A Low Cost Network-on-Chip with Guaranteed Service Well Suited to the GALS Approach", Ivan Miro Panades, Alain Greiner, Abbas Sheibanyrad, 2006. The DSPIN network offers the advantage of implementing a network with bounded latency and minimum bandwidth to transmit the interrupts and a network to transmit non-priority packets.

It will be understood by those skilled in the art that various alternative embodiments and applications of the present invention may be made. In particular, the virtual unit identifiers transmitted with the interrupts are not necessarily associated with the interrupts by the peripheral units. Indeed, this association can be done by an interface circuit for connecting to the system of the peripheral unit. In the example of the system PS8 in FIG. 8, this association can for example be done by the router ND for connecting the peripheral unit to the network NW.

Furthermore, the masking register can be optional. In some applications, it may not be necessary to mask certain interrupts according to the content of a masking register.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
sending by a peripheral unit an interrupt for a first virtual unit of a plurality of virtual units configured to be executed by a processing unit;
transmitting the interrupt to an interrupt control unit coupled to the processing unit;
storing by the interrupt control unit the interrupt in a first interrupt register of a plurality of interrupt registers associated respectively with the virtual units of the plurality of virtual units; and
transmitting the interrupt to the processing unit if the processing unit is executing the first virtual unit,
wherein the transmitting the interrupt to the interrupt control unit includes transmitting to the interrupt control unit a first identifier associated with the first virtual unit, the first identifier being one of a plurality of identifiers associated with the plurality of interrupt registers.

2. The method of claim 1, wherein transmitting the interrupt to the interrupt control unit includes transmitting the interrupt via a network, the network transmitting data in packets between the processing unit and the peripheral unit, in a packet containing an identifier of the interrupt and the first identifier associated with the first virtual unit.

3. The method of claim 1, wherein the transmitting the interrupt to the processing unit further includes transmitting the interrupt to the processing unit if the interrupt is not masked by an interrupt mask register that is associated with the first interrupt register associated with the first virtual unit.

4. The method of claim 1, wherein the transmitting the interrupt to the processing unit further includes transmitting the interrupt to the processing unit if the first virtual unit is not being executed by the processing unit and a number of interrupts stored in the first interrupt register associated with the first virtual unit exceeds a threshold.

5. The method of claim 1, wherein the transmitting the interrupt to the processing unit further includes transmitting the interrupt to the processing unit if the first virtual unit is not being executed by the processing unit and a priority granted to the interrupt exceeds a threshold.

6. The method of claim 1, wherein transmitting the interrupt to an interrupt control unit coupled to the processing unit further includes transmitting the interrupt to one of plural interrupt control units that are respectively coupled to one of plural processing units, and the method further comprising:
determining one of the plural processing units in which the first virtual unit is being executed, depending on the first identifier; and
transmitting the interrupt to a respective one of the plural interrupt control units that is coupled to the determined one processing unit.

7. The method of claim 1, further comprising:
notifying, by the processing unit, the interrupt control unit that a first virtual unit has been activated; and
supplying by the interrupt control unit to the processing unit any interrupts that are stored in the first interrupt register for the first virtual unit.

8. A data processing system, comprising:
an interrupt control unit;

a processing unit coupled to the interrupt control unit; and
a peripheral unit linked to the processing unit by a transmission network, the peripheral unit being configured to send to the interrupt control unit an interrupt for a first virtual unit of a plurality of virtual units to be executed by the processing unit,
wherein the interrupt control unit is configured to:
receive interrupts in association with a first identifier associated with the first virtual unit,
store the received interrupts in a first interrupt register of a plurality of interrupt registers associated respectively with the virtual units of the plurality of virtual units, the first identifier being one of a plurality of identifiers associated with the plurality of interrupt registers, and
transmit the interrupts to the processing unit if the first virtual unit is being executed by the processing unit.

9. The data processing system of claim 8, wherein the transmission network is configured to transmit data in packets with an adjustable quality of service, the interrupt control unit being configured to receive each of interrupts in a packet containing an identifier of the interrupt and the first identifier associated with the first virtual unit.

10. The data processing system of claim 8, wherein the interrupt control unit is further configured to transmit an interrupt of the interrupts to the processing unit if it is not masked by an interrupt mask register that is associated with the first interrupt register of the first virtual unit.

11. The data processing system of claim 8, wherein the interrupt control unit is further configured to transmit an interrupt of the interrupts to the processing unit if the first virtual unit is not being executed by the processing unit and a number of the interrupts stored in the first interrupt register exceeds a threshold.

12. The data processing system of claim 8, wherein the interrupt control unit is further configured to transmit an interrupt of the interrupts to the processing unit if the first virtual unit is not being executed by the processing unit and a priority granted to the interrupt exceeds a threshold.

13. The data processing system of claim 8, further comprising:
a plurality of processing units respectively coupled to one of a plurality of interrupt control units, the transmission network being configured to route an interrupt of the interrupts to a respective one of the plurality of interrupt control units depending on the first identifier associated with the first virtual unit received in association with the interrupts.

14. The system according to claim 8, wherein the processing unit is configured to notify the interrupt control unit of an activation of any of the plurality of virtual units.

15. A set-top box system, comprising:
a transmission network;
a processing unit;
an interrupt control unit coupled to the processing unit; and
a peripheral unit linked to the processing unit by the transmission network, the peripheral unit being configured to send the interrupt control unit an interrupt for a first virtual unit executed by the processing unit, the first virtual unit of a plurality of virtual units to be executed by the processing unit,
wherein the interrupt control unit is configured to:
receive an interrupt in association with a first identifier of the first virtual unit;
store the interrupt in a first interrupt register of a plurality of interrupt registers associated respectively with the plurality of virtual units, the first identifier being one of a plurality of identifiers associated with the plurality of interrupt registers; and
transmit the interrupt to the processing unit if the first virtual unit is being executed by the processing unit.

16. The set-top box system of claim 15, wherein the transmission network is configured to transmit packets with an adjustable quality of service, the interrupt control unit is further configured to receive the interrupt in a packet containing an identifier of the interrupt and the first identifier associated with the first virtual unit.

17. The set-top box system of claim 15, wherein the interrupt control unit is further configured to transmit an interrupt to the processing unit when the first virtual unit is not being executed by the processing unit, if at least one of: a number of interrupts stored in the first interrupt register exceeds a threshold and a priority granted to the interrupt exceeds a threshold.

18. The set-top box system of claim 15, wherein the at least one interrupt control unit includes a plurality of interrupt control units and the processing unit includes a plurality of processing units respectively coupled to the plurality of interrupt control units, the transmission network being configured to route an interrupt to a respective one of the plurality of interrupt control units depending on the first identifier received in association with the interrupt.

19. A data processing device, comprising:
an interrupt control unit configured to store received interrupts in a first interrupt register of a plurality of interrupt registers, the first interrupt register associated respectively with a first virtual unit of a plurality of virtual units, and the interrupt control unit configured to transmit the received interrupts to a processing unit if the first virtual unit is being executed by the processing unit.

20. The data processing device of claim 19, comprising:
a peripheral unit linked to the processing unit by a transmission network, the peripheral unit configured to send interrupts for the first virtual unit to the interrupt control unit, the interrupts for the first virtual unit having a first identifier associable with the first interrupt register.

21. The data processing device of claim 20 wherein the transmission network is configured to transmit data in packets.

22. The data processing device of claim 19, comprising:
a plurality of mask registers, each mask register associated with a respective one of the interrupt registers, wherein the interrupt control unit is configured to transmit a received first interrupt to the processing unit if the received first interrupt is not masked by a first mask register associated with the first interrupt register of the first virtual unit.

23. The data processing device of claim 19 wherein the interrupt control unit is configured to transmit a received first interrupt to the processing unit if the first virtual unit is not being executed by the processing unit and a number of the received interrupts stored in the first interrupt register exceeds a threshold.

24. The data processing device of claim 19 wherein the interrupt control unit is configured to transmit a received first interrupt to the processing unit if the first virtual unit is not being executed by the processing unit and a priority granted to the received first interrupt exceeds a threshold.

* * * * *